United States Patent
Andrews

[15] 3,693,738
[45] Sept. 26, 1972

[54] LEGAL LOAD INDICATOR FOR A LIQUID TANKER

[72] Inventor: Ottie H. Andrews, 2230 W. Orange Avenue, Anaheim, Calif. 92804

[22] Filed: April 7, 1971

[21] Appl. No.: 131,869

[52] U.S. Cl. .....................177/141, 177/208, 73/299
[51] Int. Cl. .............................................G01g 19/10
[58] Field of Search .........177/141, 208; 73/296, 299

[56] References Cited

UNITED STATES PATENTS

| | | |
|---|---|---|
| 1,867,216 | 7/1932 | Forney .........................73/299 |
| 1,765,008 | 6/1930 | Eynon.....................73/299 X |
| 1,646,311 | 10/1927 | Page .......................73/299 X |
| 1,646,957 | 10/1927 | Eynon .........................73/299 |
| 1,660,814 | 2/1928 | Persons ......................73/299 |
| 1,661,995 | 3/1928 | Brown .........................73/299 |
| 1,949,855 | 3/1934 | Averill..................177/141 X |

FOREIGN PATENTS OR APPLICATIONS

| | | |
|---|---|---|
| 794,941 | 5/1958 | Great Britain.............177/208 |
| 1,028,624 | 5/1953 | France......................177/208 |
| 1,226,319 | 10/1966 | Germany....................73/296 |

Primary Examiner—Richard B. Wilkinson
Assistant Examiner—George H. Miller, Jr.
Attorney—Philip M. Hinderstein

[57] ABSTRACT

A legal load indicator for a liquid tanker comprising a gauge adapted to be positioned outside of the tanker and having a pressure responsive, pivotable, pressure-weight indicating pointer and a manually rotatable face having a marker so positioned thereon as to be alignable with the pointer in a selected position thereof. A pipe connects the gauge to a bell positioned at the bottom of the tanker for conducting the pressure of the air trapped within the bell to the gauge so that the pointer indicates the weight of liquid in the tanker independently of the height and density of such liquid. By positioning the marker on the movable face relative to the pointer at a position indicative of the legal weight limit of the tanker, the tanker may be filled with any liquid to its legal weight limit. According to a preferred embodiment of the present invention, the apparatus also includes a mechanism for removing hardening materials from the bell and pipe to insure proper operation of the gauge.

8 Claims, 6 Drawing Figures

INVENTOR.
OTTIE H. ANDREWS

BY

ATTORNEYS

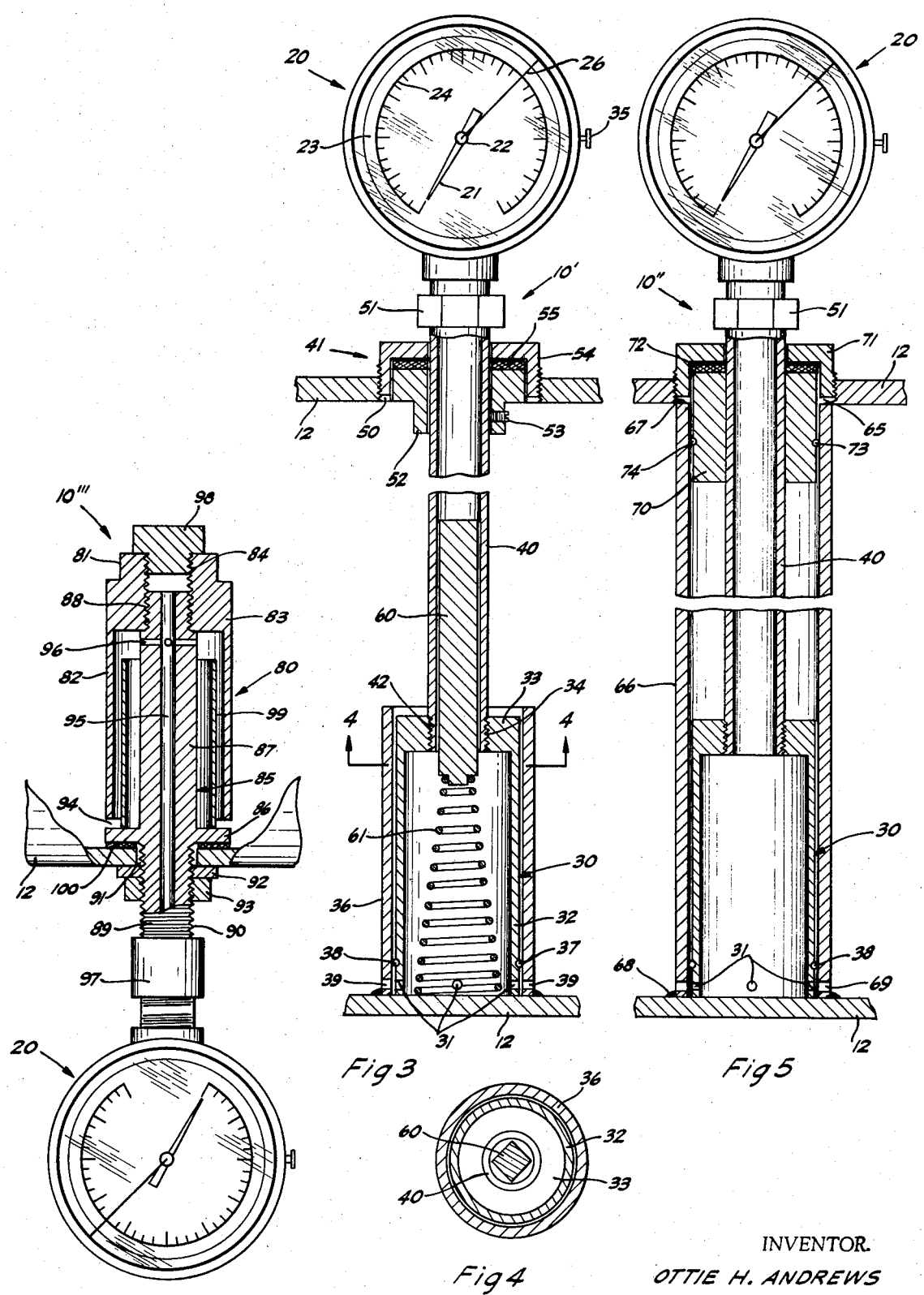

LEGAL LOAD INDICATOR FOR A LIQUID TANKER

BACKGROUND OF THE INVENTION

1. Field of the Invention

The present invention relates to a legal load indicator for a liquid tanker and, more particularly, to a device which will indicate to the driver of a liquid tanker when his tanker is legally loaded, independently of the height, density and/or temperature of the liquid being loaded.

2. Description of the Prior Art.

State and federal laws applicable in essentially every state in the United States specify the weight that may be carried by all commercial vehicles. The reason for this is quite simple. When constructing highways, freeways and even surface streets, the roadway is designed to handle a given load. Therefore, if a truck is overloaded and applies to such roadway a force greater than its capacity to withstand, the result is damage to the roadway.

Accordingly, in most states, the weight limits are strictly enforced and severe penalties are given for overloaded trucks. This represents a significant problem for liquid tankers since it is impossible, without some analytical tool, to determine the weight of the load. More specifically, the weight of the load cannot be determined from the height thereof because different products have different densities and the weight does not vary linearly with the height. For example, when hauling low density items such as aviation gasoline and the like, it may be possible to completely fill the liquid tanker before the legal weight limit is reached. On the other hand, with high density materials such as diesel oil, molasses, lead based paints and the like, only a fraction of the truck may be filled when the legal weight limit is reached.

The most obvious solution to this problem is to provide a scale adjacent the loading site so that the load may be weighed as the tanker is filled. While at first sight this may appear to be a practical solution to the problem, in practice it is not. The reason it that it is simply not practical to provide a scale capable of weighing a truck wherever these trucks are loaded. For example, a truck may be required to go into an oil field to pick up a load of crude oil or the truck may be required to go to a factory to pick up a load of a liquid product. In each of these cases, as well as many more, a scale may not be readily available. Therefore, what is required, is for the truck to have its own mechanism for weighing the load.

At the present time, the only available device for on-the-spot weighing of a liquid tanker is a float-type device commonly known as a "pogo stick." Such a device consists of a weighted stick which is positioned within a tube extending to the bottom of the liquid tanker. The weighted stick is calibrated so that when the tanker reaches its legal weight limit, the weighted stick begins to float. However, such pogo sticks have several disadvantages associated therewith. In the first instance, the pogo stick does not begin to float until the legal weight limit is reached. As a result, there is no indication that the weight limit is approaching and the truck driver must constantly look down into the truck while it is being loaded so as not to miss the exact moment when the stick begins to float. This is not only an inconvenience, but a real hazard where the liquid gives off a fume. In addition, such pogo sticks are difficult to calibrate. This is a significant problem in that there are many different types of tankers, each having their own specific legal weight limit and any device must be capable of being calibrated for each specific truck. Also, such pogo sticks must be operated from the top of the truck and they will not work in a truck which is loaded from the bottom.

SUMMARY OF THE INVENTION

According to the present invention, these problems are solved by the provision of a novel legal load indicator for a liquid tanker. The present legal load indicator is capable of indicating when a liquid tanker is filled to its legal weight limit independently of the height and density of the liquid in the tanker. The present indicator is attached directly to the tanker and is easily calibrated so that each and every liquid tanker will be able to determine when it is properly loaded regardless of the availability of a scale. The present legal load indicator works equally well with top or bottom loading trucks and shows a gradual increase in indication as the tanker is filled so that the driver knows when the weight limit is approaching. Conversely, upon unloading, the present indicator shows a gradual decrease in indication so that the driver knows when the truck is empty. Such indication is visible from the side of the truck, away from the loading area. By using the present legal load indicator, a driver will not be required to intentionally load his tanker short to avoid any chance of an overload, but may accurately load his tanker right to the weight limit, thereby also avoiding the harsh penalties associated with being overloaded.

Briefly, the present legal load indicator for a liquid tanker comprises a gauge adapted to be positioned outside of the tanker and having a pressure responsive, pivotable, pressure-weight indicating pointer and a manually rotatable face having a marker so positioned thereon as to be alignable with the pointer in a selected position thereof. A pipe connects the gauge to a bell positioned at the bottom of the tanker for conducting the pressure of the air trapped within the bell to the gauge so that the pointer indicates the weight of liquid in the tanker independently of the height and density of such liquid. By positioning the marker on the movable face relative to the pointer at a position indicative of the legal weight limit of the tanker, the tanker may be filled with any liquid to its legal weight limit. According to a preferred embodiment of the present invention, the apparatus also includes a mechanism for removing hardening materials from the bell and pipe to insure proper operation of the gauge.

It is therefore an object of the present invention to provide a legal load indicator for a liquid tanker.

It is a further object of the present invention to provide an attachment for a liquid tanker which will tell the driver when his tanker is filled to its legal weight limit.

It is a still further object of the present invention to provide a legal load indicator for a liquid tanker which may be used for either top or bottom loading tankers.

It is another object of the present invention to provide a legal load indicator for a liquid tanker which is easily calibrated and provides a continuous indication proportional to the weight of the load.

It is still another object of the present invention to provide a legal load indicating attachment for a liquid tanker which provides an indication when the tanker reaches its legal weight limit, independently of the height and density of the liquid in the tanker.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 3 is an enlarged view taken through the center of the legal load indicator of FIG. 1 and showing a first preferred embodiment thereof;

FIG. 4 is a sectional view taken along the line 4—4 in FIG. 3;

FIG. 5 is a view similar to FIG. 3 but showing a second preferred embodiment of the present legal load indicator; and FIG. 6 is a view similar to FIGS. 3 and 5 but showing a third preferred embodiment of the present legal load indicator for use with a bottom loading tanker.

DESCRIPTION OF THE PREFERRED EMBODIMENTS

Figure 1:
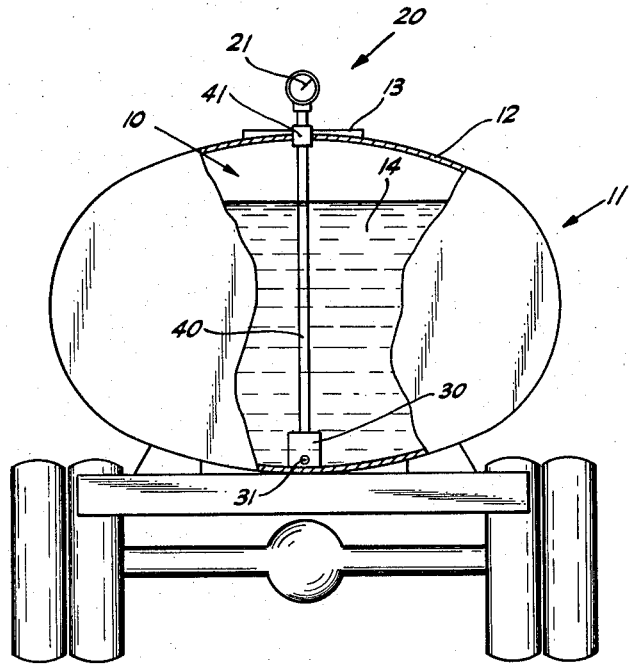
FIG. 1 is an end elevation view of a liquid tanker, partially cut away, showing the operation of the present legal load indicator.
Figure 2:
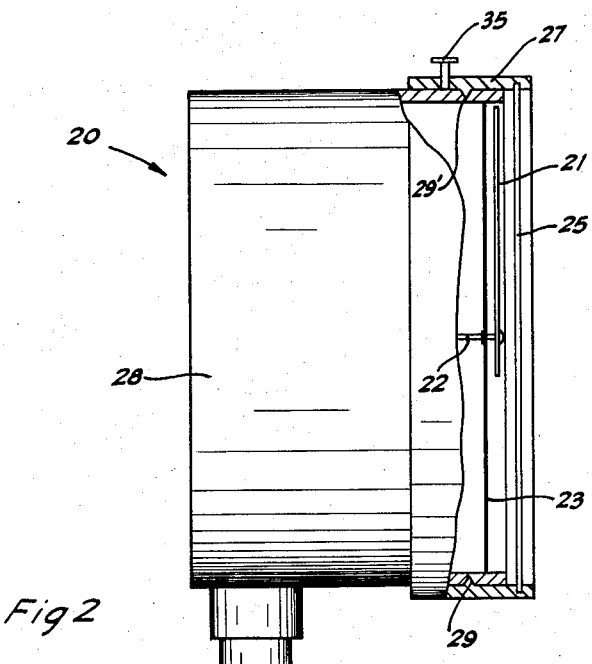
FIG. 2 is an enlarged, side elevation view of the gauge used in the indicator of FIG. 1, partly in section, showing the manner of making the face movable relative to the case.

Referring now to the drawings and, more particularly, to FIGS. 1 and 2 thereof, there is shown the general construction of a legal load indicator, generally designated 10, for a liquid tanker, generally designated 11. Tanker 11 is of conventional configuration including a hollow elongated body formed by a wall 12 and having a loading port 13 at the top thereof. In other types of tankers, loading port 13 may be at the bottom or at the side. In any event, liquid tanker 11 is designed to carry a load of liquid 14 therein.

Legal load indicator 10 has three basic components. In the first instance, legal load indicator 10 includes a gauge, generally designated 20, which is adapted to be positioned outside of tanker 11, either at the top or the bottom thereof, as will be explained more fully hereinafter with respect to FIGS. 3–6. Gauge 20 may most simply be a conventional air pressure gauge including a pressure responsive, pivotable, pressure indicating pointer 21 which is operated by an actuating shaft 22. As shown most clearly in FIGS. 3, 5 and 6, pointer 21 may be operative to indicate pressure in inches of water or mercury and for that reason may include a face 23, including a scale 24.

The second basic component of legal load indicator 10 is a hollow, bell-like structure 30 having one or more holes 31 therein and adapted to be positioned inside of tanker 11, at the bottom thereof, for trapping a volume of air thereat. The pressure of the air trapped within bell 30 is conducted to gauge 20 by the third basic component of indicator 10, namely a hollow pipe 40. Pipe 40 extends from bell 30 through wall 12 of tanker 11 to gauge 20. An adaptor, generally designated 41, described more fully hereinafter, provides a liquid tight seal at the opening through wall 12 of tanker 11.

With such a configuration, as liquid 14 is added to tanker 11, entering bell 30 through opening 31 therein, the air trapped in bell 30 and pipe 40 is compressed, thereby giving a reading on pressure gauge 20. However, the amount of compression, and hence the reading of gauge 20, depends not only on the volume of liquid 14 in tanker 11, but also on the density or specific gravity of liquid 14. A given volume of a dense liquid will cause more compression, and hence a higher reading on gauge 20 than a like volume of less dense liquid. Accordingly, gauge 20 effectively measures the load weight of liquid 14, substantially independently of variations in the density thereof.

With reference primarily to FIG. 2 and the showings of gauge 20 in FIGS. 3, 5 and 6, gauge 20 includes a manually rotatable face 25 having a marker 26 positioned thereon so as to intersect the axis of shaft 22. Thus, marker 26 is alignable with pointer 21 in a selected position thereof. More specifically, face 25 may be a transparent, disc-shaped member supported in one end of a sleeve 27. Sleeve 27 may be made rotatable relative to the case 28 of gauge 20 by positioning a groove 29 in the outer periphery of case 28, adjacent scale 23. A corresponding lip 29' in the inner surface of sleeve 27 may ride in groove 29 so that sleeve 27 and face 25 are rotatable around an axis which is coaxial with shaft 22. A set screw 35 is also provided to releasably secure movable face 25 and marker 26 thereon relative to case 28 and pointer 21.

In operation, gauge 20 may be readily calibrated for tanker 11 regardless of the configuration thereof and without any knowledge of its capacity, overall volume, etc. More specifically, tanker 11 may be positioned on a suitable scale and filled with any liquid, such as water, until the scale indicates that tanker 11 has reached its legal weight limit. At this point, set screw 35 may be loosened and sleeve 27 and face 25 rotated until marker 26 is aligned with pointer 21, regardless of what that position might be. As explained previously, this position of marker 21 is now indicative of the legal weight limit of tanker 11, independently of the height and density of liquid 14 in tanker 11. Set screw 35 is then tightened so that marker 26 remains in this relative position and truck 14 may be drained. Thereafter, regardless of what liquid is positioned within tanker 11, as the liquid is added to tanker 11, pointer 21 will provide a gradually increasing indication of the weight of the liquid therein. When pointer 21 is aligned with marker 26, the driver will know that no matter what the liquid is, his truck is properly loaded to its legal weight limit.

According to the preferred embodiment of the present invention, legal load indicator 10 may be permanently mounted within liquid tanker 11 or may be made removable for cleaning, as would be required for milk tank trucks. Furthermore, legal load indicator 10 is equally suited for top or bottom loading tankers. The specific embodiments of FIGS. 3–6 are the preferred embodiments useful in each of these cases.

Referring now to FIGS. 3 and 4, there is shown a preferred embodiment of legal load indicator 10, generally designated 10', of a type which may be permanently mounted within liquid tanker 11. More specifically, legal load indicator 10' may include a bell 30 positioned in contact with the bottom of wall 12 of tanker 11 and connected via a pipe 40 to gauge 20. Bell 30 may include a sleeve 32 open at the bottom thereof and a collar 33 at the top thereof. Collar 33 may have an internally threaded hole 34 for engagement with external threads 42 at one end of pipe 40. In this manner, an open air passage is provided from the area internally of sleeve 32 and pipe 40. As explained previously, sleeve 32 may have one or more holes 31 in the bottom thereof to permit fluid communication from tank 11 into the area encompassed by sleeve 32.

Because of the constant vibration of tanker 11 and the movement of liquid 14 therein, it is necessary to firmly anchor bell 30 at the bottom of tanker 11. According to the embodiment of FIG. 3, this may be achieved by permanently connecting a sleeve 36 to the inner surface of wall 12 of tanker 11 at the bottom thereof, the inner diameter of sleeve 36 being slightly greater than the outside diameter of sleeve 32. In this manner, bell 30 may be positioned within sleeve 36 to hold the former relative to the latter. A tight fit between sleeves 32 and 36 may be provided by positioning a groove 37 in the outer wall of sleeve 32 and by positioning a conventional O-ring 38 in groove 37. In addition, sleeve 36 may be provided with one or more holes 39 to permit fluid communication from tanker 11 through sleeve 36 to sleeve 32.

As explained previously, as liquid 14 is added to tanker 11 and enters sleeve 32 via holes 31 and 39, the air trapped in sleeve 32 and pipe 40 is compressed, thereby giving a reading on gauge 20. Accordingly, pipe 40 extends through an opening 50 in the upper end of wall 12 and is connected to pressure gauge 20 via a connector 50. An adaptor, generally designated 41, is provided to seal opening 50 in wall 12 of tanker 11 as well as to hold pipe 40 firmly in place. Adaptor 41 may take any convenient shape but, by way of example, may include a movable collar 52 connected to pipe 40 by a set screw 53. An externally threaded nut 54 is adapted to extend over pipe 40, above collar 52, and to screw into opening 50, which is internally threaded. A suitable compressible gasket 55 may be provided between nut 54 and collar 52. As should be obvious, collar 52 is made movable to account for different lengths of pipe 40 in different types of tankers 11. Other adaptors 41 will be obvious to those skilled in the art.

In some cases, liquid tankers, such as tanker 11, are utilized to haul materials which have a tendency to harden when stagnant. It can be appreciated that if such a material were to harden within pipe 40, the pressure developed within sleeve 32 would be prevented from passing to gauge 20 and the purpose of legal load indicator 10' would be defeated. In order to prevent this from happening, and in accordance with a preferred embodiment of the present invention, legal load indicator 10' may include a square or other flat-sided bar 60 positioned for a short distance, a few inches, within pipe 40. In addition, a spring 61 may be positioned between the bottom of bar 60 and the inner surface of wall 12 or tanker 11. As a result, as tanker 11 moves over a roadway, bar 60 will bounce up and down on spring 61, constantly dislodging any material that might harden along pipe 40. By making bar 60 square, and the inner surface of pipe 40 round, a suitable air passage will always exist between the outer surface of bar 60 and the inner surface of pipe 40. Therefore, with the addition of bar 60 and spring 61, legal load indicator 10' will be automatically self-cleaning.

Referring now to FIG. 5, there is shown a preferred embodiment of legal load indicator 10, generally designated 10'', of a type which may be made removable from tanker 11 for cleaning purposes, etc. More specifically, legal load indicator 10'' is itself essentially identical to legal load indicator 10' and includes a bell 30 positioned in contact with the bottom of wall 12 of tanker 11 and connected via a pipe 40 to gauge 20. Bell 30, pipe 40 and gauge 20 are identical to the corresponding components in the embodiments of FIGS. 3–4.

On the other hand, in order to make legal load indicator 10'' removable and also to firmly anchor bell 30 at the bottom of tanker 11, tanker 11 may include an opening 65 at the top thereof, through which is extended an elongated, hollow cylinder 66. Cylinder 66 should extend from the top of tanker 11 to the bottom, being connected at both places, at 67 and 68, respectively. The inner diameter of cylinder 66 may be the same as the inner diameter of sleeve 36 of the embodiment of FIG. 3, slightly greater than the outside diameter of bell 30. In this manner, bell 30 may be extended down through cylinder 66 until it contacts the bottom of wall 12 of tanker 11. A tight fit between bell 30 and cylinder 66 may be provided by O-ring 38. In addition, cylinder 66 may be provided with one or more holes 69 at the bottom thereof to permit fluid communication from tanker 11 through cylinder 66 to bell 30.

In order to seal opening 65 in wall 12 of tanker 11, opening 65 may be threaded and pipe 40 may be provided with a collar 70 having an outside diameter equal to the outside diameter of bell 30. A nut 71 and a gasket 72, similar to nut 54 and gasket 55, respectively, may be utilized to secure collar 70, pipe 40 and bell 30 relative to cylinder 66. In addition, collar 70 may be provided with a groove 73 in the outer wall thereof for receiving an O-ring 74 to provide a tight fit between collar 70 and cylinder 66.

Operation is identical to the embodiment of FIGS. 3 and 4. As liquid 14 is added to tanker 11, such liquid enters bell 30 via hole 69 in cylinder 66 and hole 31 in sleeve 32. The air trapped in bell 30 and pipe 40 is compressed, thereby giving a reading on gauge 20. In addition, bell 30 and pipe 40 may be provided with a square bar 60 and spring 61 as explained previously with respect to legal load indicator 10'.

Referring now to FIG. 6, there is shown a preferred embodiment of legal load indicator 10, generally designated 10'''; of a type which may be permanently mounted within liquid tanker 11 so as to be visible from the bottom thereof. More specifically, legal load indicator 10''' may include a bell 80 positioned adjacent the bottom of wall 12 of tanker 11, but spaced therefrom by a small distance to permit fluid communication of liquid 14 into bell 80. Bell 80 may include a sleeve 82 which is open at the bottom thereof and a collar 83 at the top thereof. Collar 83 may have an internally threaded hole 84 and an external surface 81 of a configuration suitable for use with a conventional wrench.

Bell 83 is connected to a transfer stud 85, a unitary element having several distinct sections thereof. In the first instance, transfer stud 85 is an elongated cylindrical member having a collar 86 intermediate the ends thereof. Extending above collar 86 is an elongated cylindrical section 87 which is externally threaded at the end thereof, at 88. Extending below collar 86 is an elongated cylindrical section 89 which is externally threaded throughout the entire length thereof, at 90. Section 89 extends through an opening 91 in the bottom of wall 12 of tanker 11 and receives a conventional washer 92 and nut 93, nut 93 being tightened to firmly hold transfer stud 85 in the position shown, with the bottom surface of collar 86 in contact with the inner surface of wall 12 of tanker 11. Alternatively, and as shown, a gasket 100 may be interposed between collar 86 and the inner surface of wall 12 of tanker 11. Thereafter, bell 80 is screwed down over transfer stud 85, threads 88 on section 87 engaging with threads 84 in collar 83. The length of threads 88 on section 87 are such that a space 94 exists between the bottom of sleeve 82 and collar 86 to permit fluid communication from tanker 11 into sleeve 82.

Transfer stud 85 also includes a passageway 95 running through the entire length thereof, through sections 87 and 89 and collar 86. In addition, one or more holes 96 extend through section 87 of transfer stud 85 to permit fluid communication from the outside thereof into passageway 95. In addition, the free end of section 89 of stud 85 is connected via a connector 97 to gauge 20 as in the previous embodiments.

In operation, as liquid 14 is added to tanker 11, such liquid enters sleeve 82 through opening 94. The air trapped in sleeve 82, holes 96 and passageway 95 is compressed, thereby giving a reading on gauge 20.

The upper end of threaded opening 84 in collar 83 of bell 80 may be sealed by a plug 98 to prevent escape of air out of bell 80. Alternatively, tanker 11 may be provided with a gauge 20 both at the top and bottom thereof by connecting the end of a pipe 40 to threaded hole 84 as in the embodiments of FIGS. 3-5. In this manner, the air pressure within bell 80 may be transmitted to a gauge positioned on top of tanker 11.

In order to prevent the hardening of material within bell 82, for reasons which were discussed more fully hereinbefore, bell 82 may be provided with a thin-walled sleeve 99 positioned therein, surrounding section 87 of transfer stud 85. The outer diameter of sleeve 99 would be less than the inner diameter of sleeve 82 whereas the inner diameter of sleeve 99 would be greater than the outer diameter of section 87. In addition, the length of sleeve 99 would be less than the distance between the bottom of collar 83 and the top of collar 86. In this manner, as tanker 11 moves over a roadway, sleeve 99 will bounce up and down, constantly dislodging any material that might harden or accumulate within bell 82.

It can therefore be seen that in accordance with the present invention, the problems of overloading or underloading liquid tankers are solved by the provision of a novel legal load indicator 10 for a liquid tanker 11. The present legal load indicators are capable of indicating when liquid tanker 11 is filled to its legal weight limit independently of the height and density to liquid 14. Indicators 10' through 10''' may be attached directly to tanker 11 and be easily calibrated so that each and every tanker will be able to determine when it is properly loaded regardless of the availability of a scale. The present legal load indicators work equally well with top or bottom loading trucks and show a gradual increase in indication as tanker 11 is filled so that the driver knows when the weight limit is approaching. Conversely, upon unloading, the present indicator shows a gradual decrease in indication so that the driver knows when the truck is empty. In addition, such indication is visible from the side of the truck away from loading port 13. Therefore, by using one of the present legal load indicators, a driver will not be required to intentionally load his tanker short to avoid any change of an overload, but may accurately load his tanker right to the weight limit, thereby avoiding the harsh penalties associated with being overloaded.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A legal load indicator for a liquid tanker comprising:

means adapted to be positioned inside and at the bottom of said tanker for trapping a volume of air thereat;

a gauge adapted to be positioned outside of said tanker and having a pressure responsive, movable, pressure-weight indicating pointer and a manually movable face having a marker indicated thereon, said marker being positioned on said face so as to be alignable with said pointer in a selected position thereof;

conduit means connecting said air trapping means with said gauge for conducting the air pressure therein to said gauge whereby said pointer indicates the weight of liquid in said tanker;

means for releasably securing said movable face and said marker thereon relative to said gauge and said pointer at a positive indicative of the legal weight limit of said tanker; and vibrating means positioned within said air trapping means or said conduit means for dislodging any material that might harden therein.

2. A legal load indicator for a liquid tanker according to claim 1 wherein said conduit means comprises a pipe and wherein said vibrating means comprises:

a flat-sided bar positioned within said pipe, partially extending downwardly into said air trapping means; and a spring connected to the bottom of said bar and contacting said bottom of said tanker.

3. A legal load indicator for a liquid tanker according to claim 1 wherein said conduit means comprises:

a pipe connected between said air trapping means and said gauge.

4. A legal load indicator for a liquid tanker according to claim 3 wherein said legal load indicator is removable from said tanker and further comprising:
a hollow cylinder extending from the top to the bottom of said tanker, said tanker having an opening therein above said cylinder, said air trapping means and said pipe extending through said cylinder to the bottom of said tanker; and
means for sealing said opening and for holding said legal load indicator relative to said tanker.

5. A legal load indicator for a liquid tanker according to claim 4 wherein said cylinder has at least one hole therein, adjacent the bottom thereof, to permit fluid communication from said tanker to said air trapping means.

6. A legal load indicator for a liquid tanker according to claim 1 wherein said gauge is adapted to be positioned beneath said tanker and wherein said air trapping means comprises:
a bell-shaped structure including a sleeve which is open at the bottom thereof and a collar at the top thereof; and wherein said conduit means comprises:
a transfer stud extending through an opening in the bottom of said tanker, the top of said transfer stud being connected to said collar, the bottom of said transfer stud being connected to said gauge, said transfer stud having a passageway running entirely therethrough, from said collar to said gauge, and at least one hole adjacent said gauge from said passageway to the outer surface of said stud.

7. A legal load indicator for a liquid tanker according to claim 6 wherein said transfer stud further comprises:
a collar intermediate the ends thereof, the bottom surface of said collar adapted to be positioned in contact with the inner surface of the bottom of said tanker; and
an externally threaded section extending below said collar through said opening in said tanker; and further comprising:
a nut adapted to engage said externally threaded section for holding said transfer stud relative to said tanker.

8. A legal load indicator for a liquid tanker according to claim 6 wherein said vibrating means comprises:
a sleeve positioned within said air trapping means, surrounding said transfer stud.

* * * * *